United States Patent
Kambayashi et al.

(10) Patent No.: US 11,428,621 B2
(45) Date of Patent: Aug. 30, 2022

(54) ANALYSIS CELL WITH WALL SURFACES HAVING DIFFERENT ACOUSTIC IMPEDANCES AND ANALYSIS UNIT INCLUDING THE ANALYSIS CELL

(71) Applicant: Hitachi, Ltd., Tokyo (JP)

(72) Inventors: Takuya Kambayashi, Tokyo (JP); Toshimitsu Noguchi, Tokyo (JP); Shunsuke Kono, Tokyo (JP); Akihiro Nojima, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 673 days.

(21) Appl. No.: 16/426,810

(22) Filed: May 30, 2019

(65) Prior Publication Data

US 2019/0368999 A1    Dec. 5, 2019

(30) Foreign Application Priority Data

May 31, 2018    (JP) .............................. JP2018-104896

(51) Int. Cl.
*G01N 15/14*    (2006.01)
*G01J 3/02*    (2006.01)
*G01N 21/03*    (2006.01)
*G01N 21/13*    (2006.01)
*G01N 21/15*    (2006.01)

(52) U.S. Cl.
CPC ........ *G01N 15/1404* (2013.01); *G01J 3/0291* (2013.01); *G01N 21/03* (2013.01); *G01N 21/13* (2013.01); *G01N 21/15* (2013.01); *G01N 2015/142* (2013.01); *G01N 2021/135* (2013.01)

(58) Field of Classification Search
CPC ....... G01N 2015/142; G01N 2021/135; G01N 2015/003; G01N 21/27; B01L 3/508
See application file for complete search history.

(56) References Cited

U.S. PATENT DOCUMENTS

| 2008/0170463 | A1* | 7/2008 | Murakami | .............. | B01F 31/87 366/110 |
| 2011/0244594 | A1* | 10/2011 | Horii | ................ | G01N 33/54373 436/501 |
| 2012/0086938 | A1* | 4/2012 | Folkenberg | .......... | G01N 1/4077 356/246 |

OTHER PUBLICATIONS

Ginzel, Ed, and Ben Turnbull. "Determining approximate acoustic properties of materials." NDT. net Dec. 2016: 1-10. (Year: 2016).*
Lenshof, Andreas, et al. "Acoustofluidics 5: Building microfluidic acoustic resonators." Lab on a Chip 12.4 (2012): 684-695. (Year: 2012).*

* cited by examiner

*Primary Examiner* — Eric S. McCall
*Assistant Examiner* — Timothy P Graves
(74) *Attorney, Agent, or Firm* — Crowell & Moring LLP

(57) ABSTRACT

It is possible to reduce a burden on a user in performing a spectroscopic analysis of a liquid sample. There is provided an analysis cell that is detachable and replaceable with respect to an analysis unit and accommodates a liquid sample, the analysis cell including a first wall surface pair that is made of a material transmitting a light, and a second wall surface pair for propagating an ultrasonic wave to the accommodated liquid sample, in which a first wall surface and a second wall surface forming the second wall surface pair and facing each other, are formed of materials having different acoustic impedances.

10 Claims, 17 Drawing Sheets

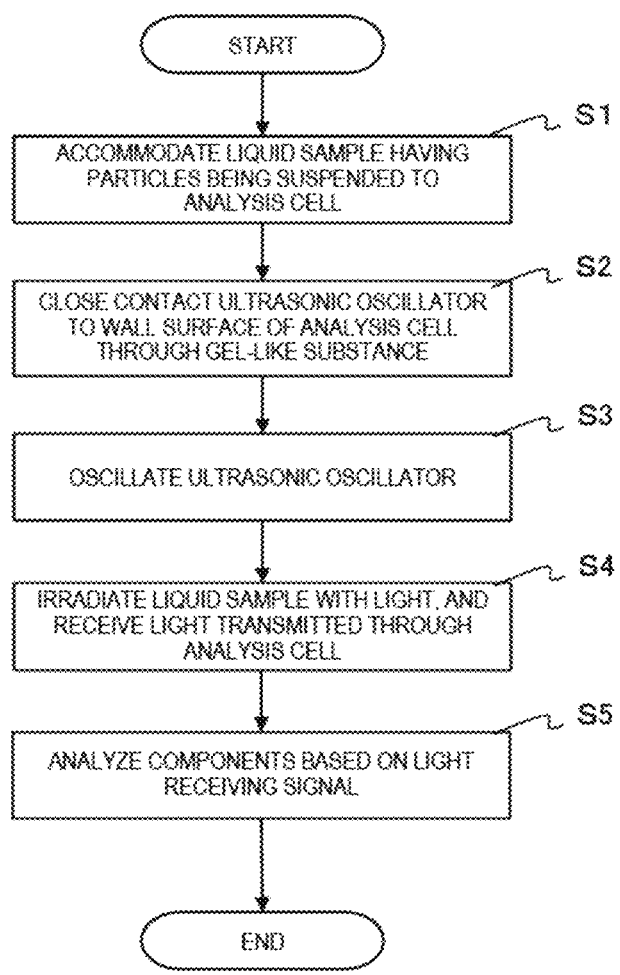

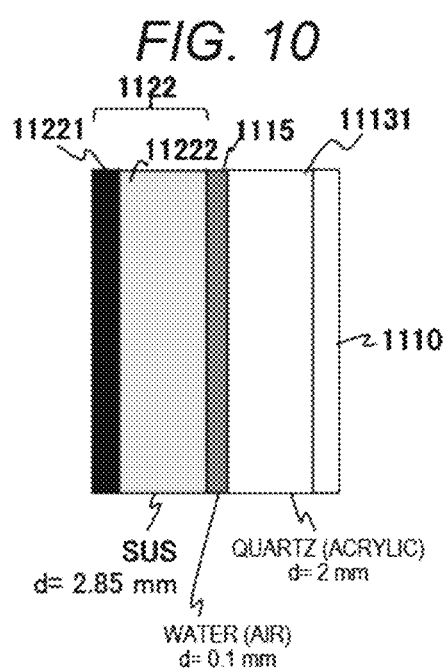

FIG. 11

| MATERIAL | DENSITY (g/cm³) | SOUND SPEED (m/s) | WAVELENGTH @2MHz (mm) | ACOUSTIC IMPEDANCE (N s/m³) |
|---|---|---|---|---|
| AIR | 0.0013 | 332 | 0.166 | 4.32E+02 |
| WATER | 1 | 1500 | 0.75 | 1.50E+06 |
| QUARTZ | 2.6 | 5900 | 2.95 | 1.53E+07 |
| SUS | 7.8 | 5700 | 2.85 | 4.45E+07 |
| ACRYLIC | 1.18 | 2730 | 1.365 | 3.22E+06 |

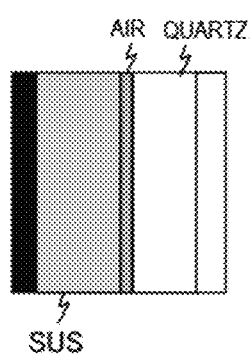
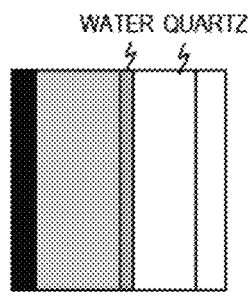
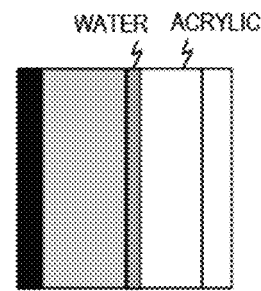
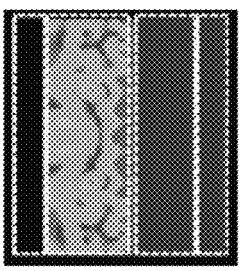
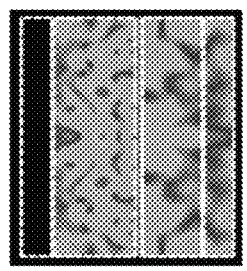
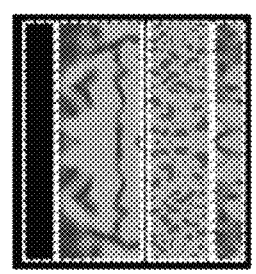
FIG. 12A     FIG. 12B     FIG. 12C

ANALYSIS CELL WITH WALL SURFACES HAVING DIFFERENT ACOUSTIC IMPEDANCES AND ANALYSIS UNIT INCLUDING THE ANALYSIS CELL

TECHNICAL FIELD

The present invention relates to an analysis cell and an analysis unit.

BACKGROUND ART

In the related art, an optical analysis is known as a method for analyzing a liquid sample. The optical analysis includes a method for analyzing a light transmitted through the liquid sample when the liquid sample is irradiated with the light or a light scattered in the liquid sample, and a method for analyzing fluorescence radiated from the liquid sample. Thereby, it is possible to detect components contained in the liquid sample. In particular, in a spectroscopic analysis for analyzing a light transmitted through a liquid sample, since the liquid sample can be analyzed by a device having a comparatively simple configuration, it is utilized in a wide range of fields.

For example, PTL 1 discloses that when performing a spectroscopic analysis, particles contained in a liquid sample are flocculated by generating a standing wave of an ultrasonic wave in the liquid sample.

CITATION LIST

Patent Literature

PTL 1: US-A-2012/0086938

SUMMARY OF INVENTION

Technical Problem

When performing a spectroscopic analysis of a liquid sample, generally, the liquid sample is irradiated with a light in a state where the liquid: sample is placed in a predetermined container. Therefore, for example, when the spectroscopic analysis is performed for a large amount of liquid sample or the spectroscopic analysis is performed continuously for different liquid samples, it is necessary to repeatedly replace the liquid sample with the container and to clean the container each time, which are a heavy burden to a user.

The present invention has been made in view of such a situation, and it is an object of the present invention to reduce a burden on a user in performing a spectroscopic analysis of a liquid sample.

Solution to Problem

The present application includes a plurality of means for solving at least a part of the above-mentioned object, for example, it is as follows. To solve the above problem, and according to one aspect of the present invention, there is provided an analysis cell that is detachable and replaceable with respect to an analysis unit and accommodates a liquid sample, the analysis cell including a first wall surface pair that is made of a material transmitting a light, and a second wall surface pair for propagating an ultrasonic wave to the accommodated liquid sample, in which a first wall surface and a second wall surface forming the second wall surface pair and facing each other, are famed of materials having different acoustic impedances.

Advantageous Effects of Invention

According to the present invention, it is possible to reduce a burden on a user in performing a spectroscopic analysis of a liquid sample.

The problems, configurations, and effects other than those described above will foe clarified from the description of the embodiments below.

BRIEF DESCRIPTION OF DRAWINGS

FIG. 9 is a flowchart illustrating an example of spectroscopic analysis processing.

FIG. 10 is a view showing an analysis model used for a propagation simulation.

FIG. 11 is a view showing specifications of substances used in the analysis model.

FIGS. 12A to 12C are views showing examples of results of the propagation simulation.

DESCRIPTION OF EMBODIMENTS

In the embodiments below, the description will be divided into a plurality of sections or embodiments if necessary. These are not irrelevant to each other unless stated explicitly, and one is related to the modifications, the details, the supplementary explanation, or the like of part or all of the other. In the embodiments below, the number of components (pieces, numerals, amount, range, or the like) is not limited to the particular number unless explicitly stated or specifically being limited to the particular number in principle, and may foe greater than or equal to the described number or less than or equal to the described number.

It is needless to say that, in the embodiments below, the configuration elements (including the steps or the like) are not necessarily essential unless explicitly stated or clearly considered necessary in principle. Similarly, in each of the embodiments below, the shape, the positional relation, and the like of the configuration elements include the shape and the like that are substantially the same or similar to those unless explicitly stated or clearly considered inappropriate in principle. This similarly applies to the numeral and the range. Throughout the drawings for describing each embodiment, the same member is generally denoted by the same sign and the overlapping description is omitted.

Hereinafter, an embodiment of the present invention will be described with reference to the drawings. In the description of the configuration of the embodiment, three axes (X, Y, Z) orthogonal to each other are used, for understanding. Even if the configuration of each embodiment does not strictly coincide with the XYZ axes, it is permissible to change within a range that can achieve substantially the same operational effect.

<Configuration Example of Optical Analysis Device to which Present Invention is Applied>

Figure 1:
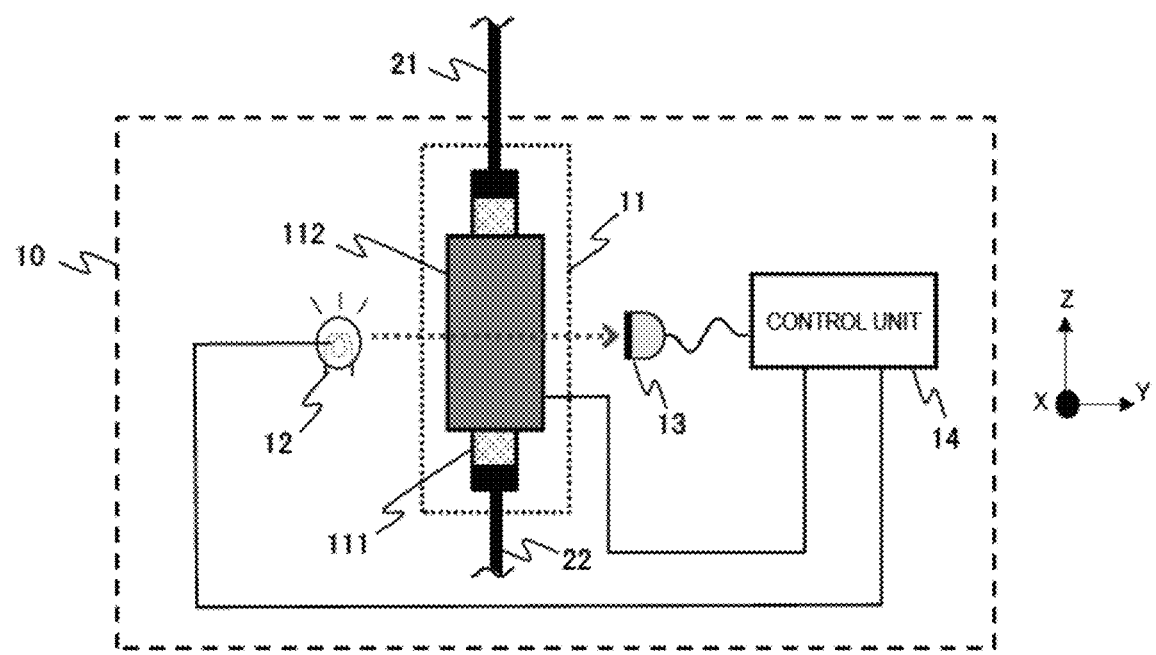
FIG. 1 is a diagram showing a configuration example of an optical analysis device according to an embodiment of the present invention.

FIG. 1 shows a configuration example of an optical analysis device using an analysis unit according to an embodiment of the present invention. The optical analysis device 10 is a device that quantitatively evaluates components included in a liquid having particles being suspended by a spectroscopic analysis.

Hereinafter, a liquid having particles being suspended, which is an object of a spectroscopic analysis, is referred to as a liquid sample. Further, a substance which is suspended in the liquid sample is called a suspended substance. Examples of the liquid sample include blood, chemical products, factory waste water, emulsion including oil droplets, or the like.

The optical analysis device 10 includes an analysis unit 11, a light source portion 12, a light receiving portion 13, a control unit 14, and pipes 21 and 22.

Figure 2:
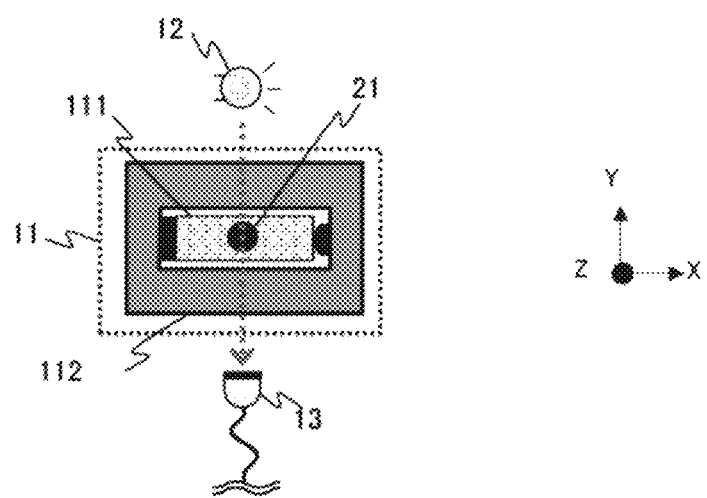
FIG. 2 is a top view showing a configuration example of an analysis unit.

FIG. 2 shows a top view of the analysis unit 11 according to the embodiment of the present invention.

The analysis unit 11 configured with an analysis cell 111 and a holder 112. In the analysis cell 111, a liquid sample is accommodated via the pipe 21. The analyzed liquid sample is discharged from the analysis cell 111 via the pipe 22.

The analysis cell 111 is detachable and replaceable with respect, to the holder 112, and disposable. In this way, it is unnecessary to wash out the analysis cell 111, and a load on a user can be reduced. Note that, the analysis cell 111 may be reused without being disposable.

A position at which the analysis cell 111 can be detachable and replaceable with respect to the holder 112 may be detachable and replaceable including the pipes 21 and 22, or may be detachable and replaceable including a supply port 1141 and a discharge port 1142.

As shown in FIG. 2, the holder 112 is formed in a cylinder shape so that the analysis cell 111 can be inserted in a Z axis direction, and is formed so that the inserted analysis cell 111 can be held with gaps in a Y direction. As a result, it is possible to prevent a wall surface pair 1112 of the analysis cell 111 (FIG. 3) from being rubbed and scratched by inner walls of the holder 112, and the transparency thereof is prevented from decreasing.

In accordance with a control from the control unit 14, the light source portion 12 irradiates the liquid sample accommodated in the analysis cell 111 with a light having a predetermined wavelength, through an irradiation hole 1125 (FIG. 6) formed in the holder 112. The light source portion 12 can be realized by a light emitting element such as a light emitting diode (LED), for example.

The light receiving portion 13 receives the light irradiated from the light source portion 12 and transmitted through the liquid sample via the irradiation hole 1125 (FIG. 6) formed in the holder 112, and outputs a light receiving signal indicating an intensity of the light to the control unit 14. The light receiving portion 13 can be realized from a light receiving element such as a photodiode (PD), for example.

The control unit 14 controls irradiation of a light by the light source portion 12. In addition, the control unit 14 analyzes components contained in the liquid sample based on the light receiving signal supplied from the light receiving portion 13. Further, the control unit 14 includes a drive unit 141 (FIG. 5) for driving an ultrasonic oscillator 1122 (FIG. 5), and controls an oscillation of the ultrasonic wave by the ultrasonic oscillator 1122. The control unit 14 can be realized by, for example, a microcomputer including a central processing unit (CPU), a random access memory (RAM), or the like, or a dedicated hardware circuit.

Figure 3:
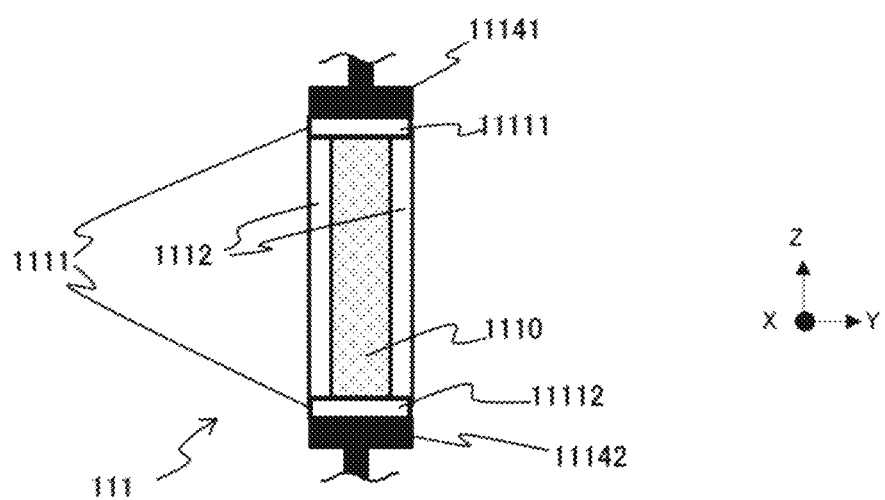
FIG. 3 is a side view of a YZ plane showing a configuration example of an analysis cell.
Figure 4:
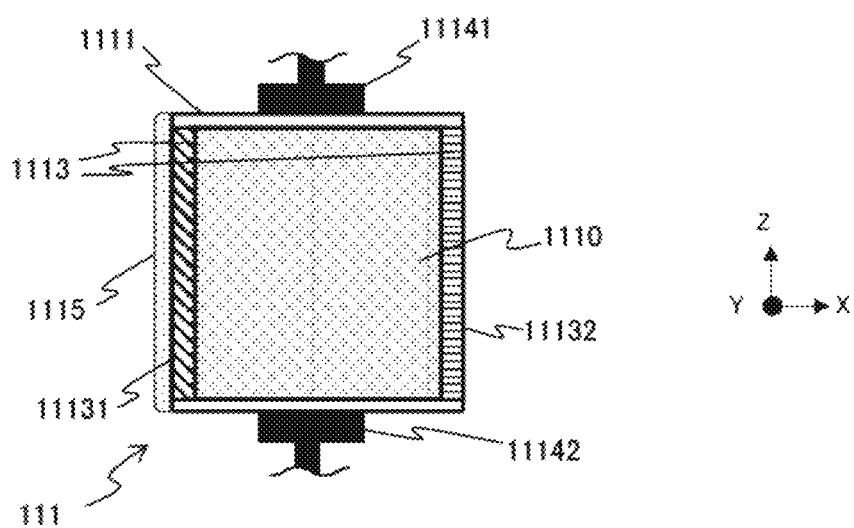
FIG. 4 is a side view of an XZ plane showing a configuration example of the analysis cell.

Next, FIG. 3 is a side view of a YZ plane showing a configuration example of the analysis cell 111, FIG. 4 is a side view of an XZ plane showing a configuration example of the analysis cell 111.

The analysis cell 111 is a rectangular parallelepiped configured with three sets of wall surface pairs which are configured with two wall surfaces facing each other, that is, a wall surface pair 1111 configured with two facing wall surfaces parallel to the XY plane, a wall surface pair 1112 configured with two facing wall surfaces parallel to the XZ plane, and a wall surface pair 1113 configured with two facing wall surfaces parallel to the YZ plane.

The wall surface pair 1111 corresponds to a third wall surface pair of the present invention. The wall surface pair 1112 corresponds to a first wall surface pair of the present invention. The wall surface pair 1113 corresponds to a second wall surface pair of the present invention.

On an upper side wall surface 11111 forming the wall surface pair 1111, a supply port 1141 connected to the pipe 21 for supplying a liquid sample 1110 to the analysis cell 111 is provided. Further, on a lower side wall surface 11112 forming the wall surface pair 1111, a discharge port 1142 connected to the pipe 22 for discharging the liquid sample 1110 from the analysis cell 111 is provided.

The two facing wall surfaces forming the wall surface pair 1112 are made of an optically transparent material (for example, quartz glass, acrylic, or the like), and a light with which the liquid sample is irradiated from the light source unit 12 passes through the two facing wall surfaces forming the wall surface pair 1112.

The wall surface pair 1113 is configured with a wall surface 11131 on the side in contact with the ultrasonic oscillator 1122 (FIG. 5) of the holder 112 and a wall surface 11132 for reflecting the ultrasonic wave propagated through the liquid sample 1110. Materials having different acoustic impedances are used for the wall surface 11131 and the wall surface 11132, and for the wall surface 11131, a material having a smaller acoustic impedance than a material of the wall surface 11132 is used. For example, a quartz glass or an acrylic is used for the wall surface 11131, and metal such as stainless steel is used as the wall surface 11132. The thickness of the wall surface 11131 is desirably an integral multiple of ½ of a wavelength λ of the ultrasonic wave. As a result, the ultrasonic wave can be easily propagated through the wall surface 11131.

On an outside of one side of the wall surface 11131 forming the wall surface pair 1113 (the side closely contacting the ultrasonic oscillator 1122 (FIG. 5) of the holder 112), a gel like substance 1115 is provided. The gel-like substance 1115 can foe provided outside the wall surface 11131, for example, by coating. For the gel-like substance 1115, a material which is equivalent to water, which has an acoustic impedance close to the acoustic impedance of the wall surface 11131 as compared with air, and which is easily deformed, is used. It is desirable that the thickness of the gel-like substance 1115 is sufficiently thin as compared with the wavelength of the ultrasonic wave λ.

By providing the gel-like substance 1115 between the wall surface 11131 and the ultrasonic oscillator 1122, a microscopic gap (air layer) formed between the wall surface 11131 and the ultrasonic oscillator 1122 can be filled with the gel-like substance 1115, so that the wall surface 11131 and the ultrasonic oscillator 1122 can actually be in close contact with each other. Further, it is possible to reduce a difference in acoustic impedance at the boundary between the gel-like substance 1115 and the wall surface 11131. Therefore, it is possible to easily propagate the ultrasonic wave, in which the ultrasonic oscillator 1122 has oscillated, to the liquid sample 1110 through the wall surface 11131.

Note that the gel-like substance 1115 provided outside the wall surface 11131 may be omitted. In that case, as described above, the microscopic gap (air layer) may be formed between the wall surface 11131 and the ultrasonic oscillator 1122, and a difference in acoustic impedance at the boundary between the air layer and the wall surface 11131 becomes larger than at the boundary between the gel-like substance 1115 and the wall surface 11131, so that it is difficult to propagate the ultrasonic wave in which the ultrasonic oscillator 1122 has oscillated. In order to prevent this, it is necessary to supply a larger drive electric power to the ultrasonic oscillator 1122 to cause the ultrasonic oscillator 1122 to oscillate larger.

In other words, by providing the gel-like substance 1115 between the wall surface 11131 and the ultrasonic oscillator 1122, it is unnecessary to oscillate the ultrasonic oscillator 1122 largely, so that power saving of the ultrasonic oscillator 1122 can be realized.

Figure 5:
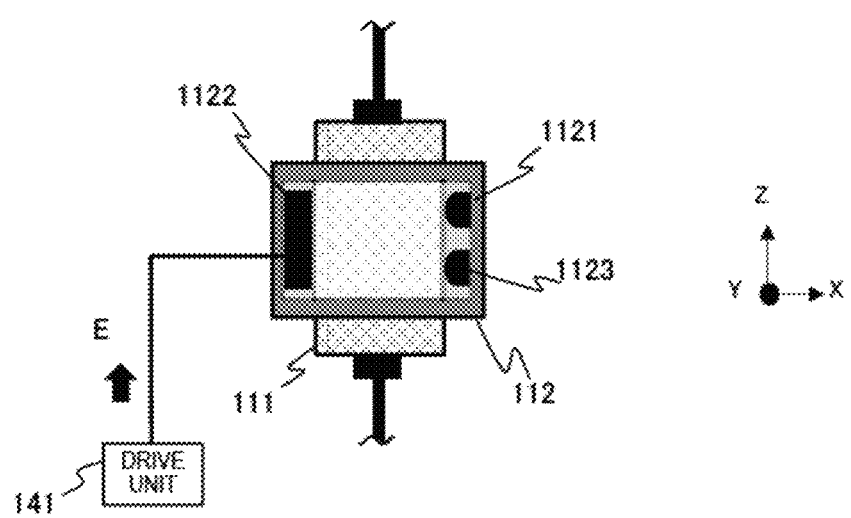
FIG. 5 is a cross-sectional view of the XZ plane showing a configuration example of a holder.
Figure 6:
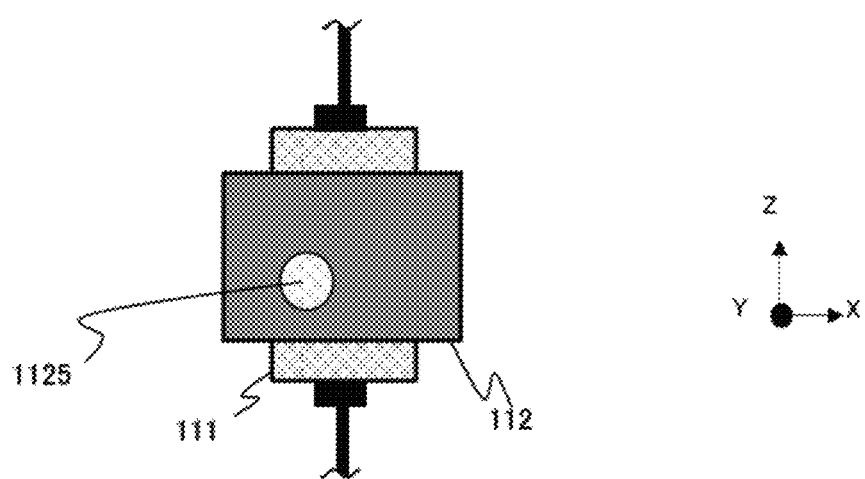
FIG. 6 is a side view of the XZ plane showing a configuration example of the holder.

FIG. 5 is a cross-sectional view of the XZ plane showing a configuration example of the holder 112. FIG. 6 is a side view of the XZ plane showing a configuration example of the holder 112.

In the holder 112, the ultrasonic oscillator 1122 is provided on one side of an inner side of two wall surfaces parallel to the YZ plane configuring a cylinder shaped housing 1121, and contact terminals 1123 are provided on the other side.

The housing 1121 is made of a material that does not transmit a light. In the housing 1121, surfaces parallel to the XY plane are opened, and the analysis cell 111 can be inserted. Irradiation holes 1125 are formed in each of the surfaces of the wall surface pair parallel to the XZ plane forming the housing 1121 of the holder 112. Note that, positions of the irradiation holes 1125 will be described later with reference to FIG. 8. By forming the housing 1121 of the holder 112 from a material that does not transmit a light, it is possible to prevent a light from being incident on the analysis cell 111 inserted into the holder 112 other than the irradiation hole 1125. Note that instead of forming the irradiation holes 1125, a material that transmits a light, may be used only at the positions of the irradiation holes 1125. Furthermore, the entire analysis unit in a state in which the analysis cell 111 is inserted may be housed in a light-shielded box. In that case, the entire housing 1121 may be made of a material that transmits a light.

The ultrasonic oscillator 1122 is in close contact with the wall surface 11131 of the analysis cell 111 through the gel-like substance 1115. The ultrasonic oscillator 1122 oscillates an ultrasonic wave based on a drive signal E from a drive unit 141 included in the control unit 14. The ultrasonic wave, in which the ultrasonic oscillator 1122 has oscillated, is propagated to the liquid sample through the gel-like substance 1115 and the wall surface 11131. The contact terminals 1123 are in close contact with the wall surface 11132 of the analysis cell 111 and has a function of pressing the analysis cell 111 against the ultrasonic oscillator 1122. The contact terminals 1123 can be realized by, for example, an elastic body such as a rubber or a spring, a screw, or the like.

<Problems in Spectroscopic Analysis of Liquid Sample>

Figure 7A:
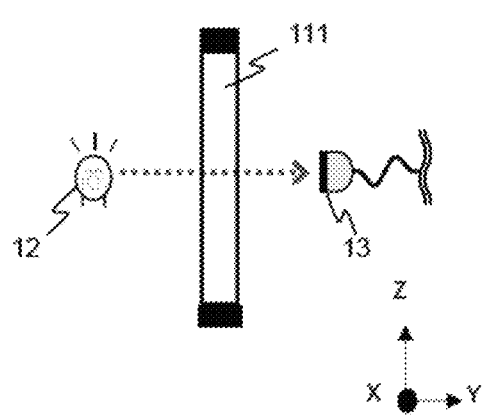
FIGS. 7A and 7B are views for explaining a problem in analyzing a liquid sample.

Next, a problem in analyzing a liquid sample will be described with reference to FIG. 7. FIG. 7(A) shows a case where a particle is not suspended in a liquid sample, and FIG. 7(B) shows a case where particles are suspended in a liquid sample.

As shown in FIG. 7(A), in a case where the transparent liquid sample is accommodated, in the analysis cell 111, when a light with which the liquid sample is irradiated from the light source portion 12 is transmitted through the liquid sample, the light is received by the light receiving portion 13 after a part of the light is absorbed by the components contained in the liquid sample.

Since an amount and a wavelength of the light absorbed by the components contained in the liquid sample are different, depending on the components, the components contained in the liquid sample can be specified by analyzing the light received by the light receiving portion 13. Also, since the amount of the absorbed light depends on the amount of components contained in the liquid sample, by fixing a distance (optical path length) of the light advancing in the analysis cell 111, a quantitative analysis of the components can be achieved. Therefore, when the liquid sample is transparent, the light, advances straight, the optical path length becomes constant, and a quantitative analysis of the components can be achieved accurately.

Figure 7B:
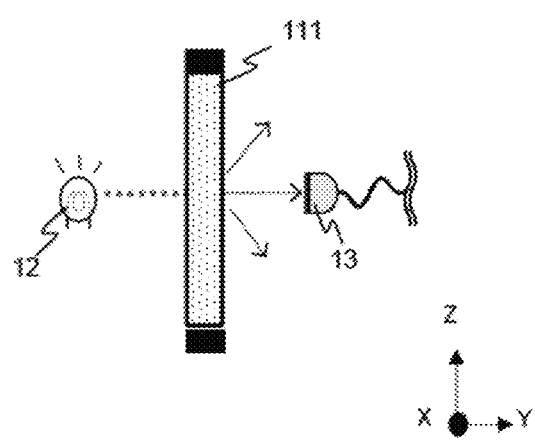

On the other hand, as shown in FIG. 7(B), when a liquid sample having particles being suspended is accommodated in the analysis cell 111, the light with which the liquid sample is irradiated from the light source portion 12 is reflected by the suspended substances in the liquid sample, and does not reach the light receiving portion 13 or is multiple scattered by the suspended substances. That is, the optical path length of the light advancing in the analysis cell 111 is not constant. For this reason, a quantitative analysis of the components contained in the liquid sample cannot be achieved, or a quantitative analysis cannot be achieved accurately.

In the optical analysis device 10 to which the present, invention is applied, suspended substances are flocculated by generating a standing wave of an ultrasonic wave in a liquid sample, and a light is transmitted from the light source portion 12 to a region where suspended substances in the liquid sample are small. As a result, a light reflection, and a multiple scattering due to the suspended substances can be suppressed, and since the optical path length of the light advancing in the analysis cell 111 can be made constant, a quantitative analysis of the components contained in the liquid sample can be achieved.

<Principle of Flocculating Suspended Substances Contained in Liquid Sample>

Figure 8A:
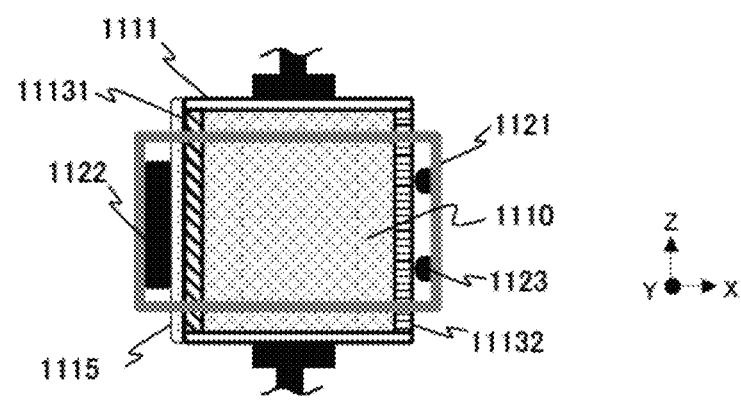
FIGS. 8A to 8C are views for explaining the principle of flocculating particles by using ultrasonic waves.
Figure 8B:
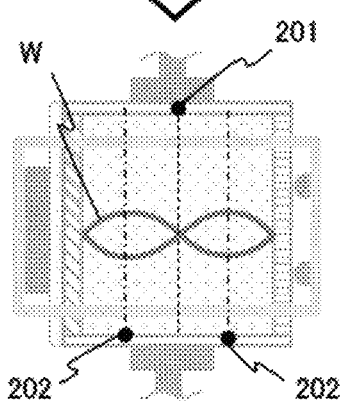

Next, FIG. 8 are views for explaining the principle of flocculating the suspended substances contained in the liquid sample, FIG. 8(A) shows a state in which the ultrasonic oscillator 1122 does not oscillate an ultrasonic wave, and FIG. 8(B) shows a state in which the ultrasonic oscillator 1122 oscillates ultrasonic waves. FIG. 8 (C) shows a state in which suspended substances in the liquid sample are flocculated by the oscillation of the ultrasonic waves.

First, an effect of providing the gel-like substance 1115 outside the one of the wall surface 11131 forming the wall surface pair 1113 of the analysis cell 111, and an effect that the acoustic impedance of the wall surface 11131 forming the wall surface pair 1113 is smaller than the acoustic impedance of the wall surface 11132, will be described.

Generally, when a sound wave passes through a boundary where substances having different acoustic impedance values are in contact, the sound wave is reflected at the boundary, and the sound wave tends to be difficult to be transmitted through the boundary. The tendency becomes more conspicuous as the difference in acoustic impedance between the substances to be contacted is larger.

When the gel-like substance 1115 is not provided on the wall surface 11131 of the analysis cell 111, the ultrasonic oscillator 1122 and the wall surface 11131 are in contact with each other via an extremely thin, air layer. The acoustic impedance of air is about 400 Ns/m³, while the solid wall surface 11131 has a large acoustic impedance of 5 digits or more. Therefore, when an air layer is interposed between the ultrasonic oscillator 1122 and the wall surface 11131, there is a boundary where the acoustic impedances are largely different, so that the ultrasonic wave, in which the ultrasonic oscillator 1122 has oscillated, is almost reflected at the boundary between the air layer and the wall surface 1131 and is not propagated into the analysis cell 111.

However, in the present embodiment, the gel-like substance 1115 is provided on the wall surface 11131. A substance having an acoustic impedance (1.50×10⁶ Ns/m³) similar to that of water is used for the gel-like substance 1115, the value is closer to the acoustic impedance of the solid wall surface 11131 than the acoustic impedance of the air.

Therefore, as shown in FIG. 8(a), when the gel-like substance 1115 is provided between the ultrasonic oscillator 1122 and the wall surface 11131, the ultrasonic wave from the ultrasonic oscillator 1122 becomes hard to be reflected at the boundary between the gel-like substance 1115 and the wall surface 1131, passes through the boundary, and is propagated to the wall surface 11131. Accordingly, it is possible to efficiently propagate the ultrasonic wave to the liquid sample 1110 in the analysis cell 111. Further, since the gel-like substance 1115 which is easily deformed is in contact, the ultrasonic oscillator 1122 and the wall surface 11131 can easily adhere to each other.

The ultrasonic wave propagated to the liquid sample 1110 accommodated in the analysis cell 111 advances in a plus direction of the X axis, and is a reflected wave which is reflected by the wall surface 11132 and advances in a minus direction of the X axis. Then, a traveling wave advancing in the plus direction of the X axis and a reflected wave advancing in the minus direction of the X axis interfere with each other to generate a standing wave in the liquid sample 1110, and a transparent region is formed by a sound pressure difference in the standing wave.

For this reason, the ultrasonic wave is easily transmitted through the wall surface 11131, and by configuring the wall surface 11132 with a material which easily reflects ultrasonic waves, the above-described sound pressure difference is increased, so that the suspended substances are more easily flocculated and the number of suspended substances in the transparent region can be further reduced.

That is, the wall surface 11131 is formed of a material having an acoustic impedance similar to that of the gel-like substance 1115, and the wall surface 11132 is formed of a material having a large difference in the acoustic impedance from the liquid sample 1110, so that the number of suspended substances contained in the transparent region can be further reduced.

Note that, since the liquid sample 1110 generally contains a lot of water, the acoustic impedance of the liquid sample is about the same as that of water. When the acoustic impedance of the wall surface 11132 is about the same as that of the liquid sample 1110, the ultrasonic wave reaching the wall surface 11132 is not reflected by the wall surface 11132 and is easily transmitted. Therefore, the acoustic impedance of the wall surface 11132 needs to be larger than the acoustic impedance of the liquid sample 1110. As the acoustic impedance of the wall surface 11132 is increased, the difference from the acoustic impedance of the liquid sample 1110 becomes larger, and the ultrasonic wave can be easily reflected on the wall surface 11132.

FIG. 8(B) shows an example of a standing wave of the ultrasonic wave generated in the liquid sample 1110.

By a standing wave W, a sound field corresponding to a unique frequency of the ultrasonic wave in which the ultrasonic oscillator has oscillated, is formed in the liquid sample 1110. Specifically, the sound field is formed in which a node 201, which is a high sound pressure region, and an anti-node 202, which is a low sound pressure region, periodically appear. The node 201 and the anti-node 202 are formed in a plane shape parallel to the YZ plane with an interval in the X direction.

By forming of the standing wave W, the suspended substance, which Is sufficiently small compared to the interval between the node 201 and the anti-node 202, receives a force (acoustic radiation force) toward the node 201 or the anti-node 202 corresponding to a property value (mass or the like) of the suspended substance and is flocculated at a position of the node 201 or the anti-node 202.

Figure 8C:
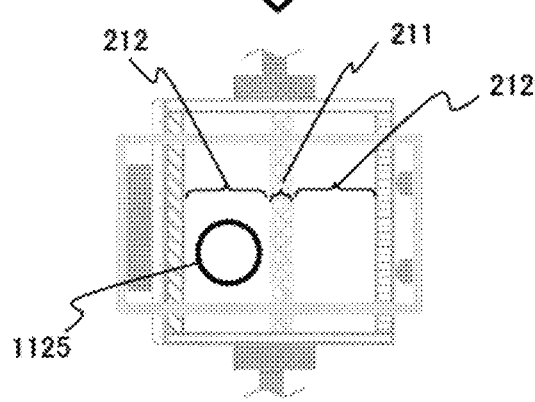

FIG. 8(C) shows an example in which the suspended substances are flocculated at the node 201 and around the node 201. As a result of flocculation of the suspended substances, a flocculation region 211 with a lot of suspended substances and a transparent region 212 with less suspended substances, periodically appear in the analysis cell 111. Note that the transparent region 212 may not contain the suspended substance.

The pair of irradiation holes 1125 provided in the housing 1121 of the holder 112 is formed so as to correspond to a position where the transparent region 212 appears by the oscillation of the ultrasonic wave. As a result, a light with which the liquid sample is irradiated from the light source portion 12 is incident on the analysis cell 111 from one side of the irradiation hole 1125 provided in the housing 1121, passes through the transparent region 212 of the liquid sample 1110 so that, the reflection and the scattering by the suspended substances are suppressed, and can reach the light receiving portion 13 through the other side of the irradiation hole 1125. As a result, even with the liquid sample 1110 having particles being suspended, it is possible to accurately and quantitatively analyze the components contained therein. Note that the flocculation region 211 may be included in a part of the region of the irradiation holes 1125.

<Spectroscopic Analysis Processing by Optical Analysis Device 10>

FIG. 9 is a flowchart illustrating an example of spectroscopic analysis processing by the optical analysis device 10.

The spectroscopic analysis processing is started in response to a predetermined operation from a user.

First, the liquid sample 1110 is accommodated: in the analysis cell 111 by a predetermined operation by the user (step S1). Next, the user inserts the analysis cell 111 into the holder 112, brings one side of the wall surface 11131 of the wall surface pair 1113 of the analysis cell 111 into close contact with the ultrasonic oscillator 1122 through the gel-like substance 1115, and the other side of the wall surface 11132 is brought into close contact with the close contact terminals 1123 (step S2).

Next, the ultrasonic oscillator 1122 oscillates an ultrasonic wave based on the drive signal E from the drive unit 141 included in the control unit 14. As a result, the ultrasonic wave is propagated to the liquid sample 1110 in the analysis cell 111, the standing wave W is generated, and the suspended substances are flocculated in the node 201 (or the anti-node 202) (step S3).

Next, in accordance with the control from the control unit 14, the light source portion 12 irradiates the analysis cell 111 with a light of a predetermined wavelength through the irradiation hole 1125 formed in the holder 112, the light receiving portion 13 receives the light transmitted through the transparent region 212 of the liquid sample 1110, and a light receiving signal indicating an intensity of the light is output to the control unit 14 (step S4).

Next, the control unit 14 performs an spectroscopic analysis of the components contained in the liquid sample 1110 based on the light receiving signal from the light receiving portion 13 (step S5). With the above, the spectroscopic analysis processing by the optical analysis device 10 is terminated.

According to the spectroscopic analysis processing described above, by generating a standing wave of the ultrasonic wave in the liquid sample 1110 due to the propagation of the ultrasonic wave, and by flocculating the suspended substances, the transparent region 212 can be created. Since the control unit 14 performs the spectroscopic analysis based on the light receiving signal corresponding to the light transmitted through the transparent region 212, the components contained in the liquid sample 1110 can be quantitatively analyzed.

<About Ultrasonic Wave Propagation Simulation>

Next, an ultrasonic wave propagation simulation performed, by the present inventors will be described.

FIG. 10 is a view showing an analysis model used for the propagation simulation. The analysis model simulates the ultrasonic oscillator 1122, the gel-like substance 1115, the wall surface 11131, and the liquid sample 1110.

Generally, an ultrasonic oscillator is configured such that a vibration portion adheres to a metal substrate. Therefore, in the analysis model, it is assumed that the ultrasonic oscillator 1122 has a configuration in which a vibration portion 11221 and a metal substrate 11222 made of stainless steel (SUS) having a thickness of 2.85 mm adhere to each other.

It is assumed that the gel-like substance 1115 in the analysis model has a thickness of 0.1 mm, and the same value as the acoustic impedance of water is used as the acoustic, impedance of the gel-like substance 1115. Note that, in the following description, a propagation simulation when an air layer having a thickness of 0.1 mm is present without providing the gel-like substance 1115, is also mentioned.

It is assumed that the wall surface 11131 in the analysis model has a thickness of 2 mm and is configured with a material such as a quartz glass or an acrylic.

FIG. 11 shows a density, a sound speed, a wavelength, and an acoustic impedance of a material (air, water, quartz, stainless steel, or acrylic) assumed for the configuration elements of the analysis model.

In the propagation simulation, a resonance frequency of the ultrasonic oscillator 1122 is set to 2 MHz, and a pressure distribution in each substance when the ultrasonic wave, in which the vibration portion 11221 of the ultrasonic oscillator 1122 has worked, reaches the liquid sample 1110 through the metal substrate 11222, the gel-like substance 1115, and the wall surface 11131, is analyzed. Note that as the acoustic impedance of the liquid sample 1110, the same value as the acoustic impedance of water is used.

In FIG. 12, an upper line shows the analysis models and a lower line shows results of the propagation simulations.

FIG. 12(A) shows a case where the wall surface 11131 of the analysis model is made of a quartz glass, the gel-like substance 1115 is omitted, and an air layer is present instead of the gel-like substance 1115. FIG. 12(B) shows a case where the wall surface 11131 of the analysis model is made of a quartz glass and the acoustic impedance of the gel-like substance 1115 is the same as water. FIG. 12(C) shows a case where the wall surface 11131 of the analysis model is made of an acrylic and the acoustic impedance of the gel-like substance 1115 is the same as water.

In the propagation simulation, in each analysis model, it is determined whether or not the ultrasonic wave from the vibration portion 11221 reaches a reception surface by comparing an average pressure in the XY cross section of the reception surface (that is, the liquid sample 1110) inside the wall surface 11131.

In a case of FIG. 12(A), the average pressure in the XY cross section of the reception surface is substantially 1/100 of the average pressure in the XY cross section of the metal substrate 11222 made of SUS. It implies that the ultrasonic wave is reflected at a boundary between the air layer and the quartz glass and the ultrasonic wave from the vibration portion 11221 hardly reaches the wall surface 11131 or the liquid sample 1110.

On the other hand, in a case of FIG. 12(B), the average pressure in the XY cross section of the reception surface is substantially 1/4 of the average pressure in the XY cross section of the metal substrate 11222 made of SUS, which is larger than in the case of FIG. 12(A). This is because the ultrasonic wave from the vibration portion 11221 is propagated without being reflected as much as in the case of FIG. 12(A) at the boundary between the gel-like substance 1115 and the quartz glass, and reaches the wall surface 11131 or the liquid sample 1110.

Further, in a case of FIG. 12(C), the average pressure in the XY cross section of the reception surface is substantially 2/3 of the average pressure in the XY cross section of the metal substrate 11222 made of SUS, which is larger than in the case of FIG. 12(B). Since the acoustic impedance of the acrylic ($3.22\times10^6$ Ns/m$^3$) is closer to the acoustic impedance of water ($1.50\times10^6$ Ns/m$^3$) than the acoustic impedance of the quartz glass ($1.53\times10^7$ Ns/m$^3$), the acrylic is easier to propagate ultrasonic waves to wafer than the quartz glass (in other words, the ultrasonic wave is hardly reflected at the boundary between the acrylic and water).

These analysis results imply that, by close contacting the ultrasonic oscillator 1122 and the wall surface 11131 with each other through the gel-like substance 1115, it is possible to efficiently propagate the ultrasonic wave into the analysis cell 111.

Also, the result of the propagation simulation shown in FIG. 12(A) implies that the ultrasonic wave is efficiently reflected by the difference in the acoustic impedance, and from this result, it can be inferred that the ultrasonic wave propagated in the analysis cell 111 is efficiently reflected on the wall surface 11132 from the fact that the acoustic impedance of the liquid sample 1110 and the acoustic impedance of the wall surface 11132 are largely different from each other.

<First Configuration Example of Optical Analysis System to which Optical Analysis Device 10 is Applied>

Figure 13:
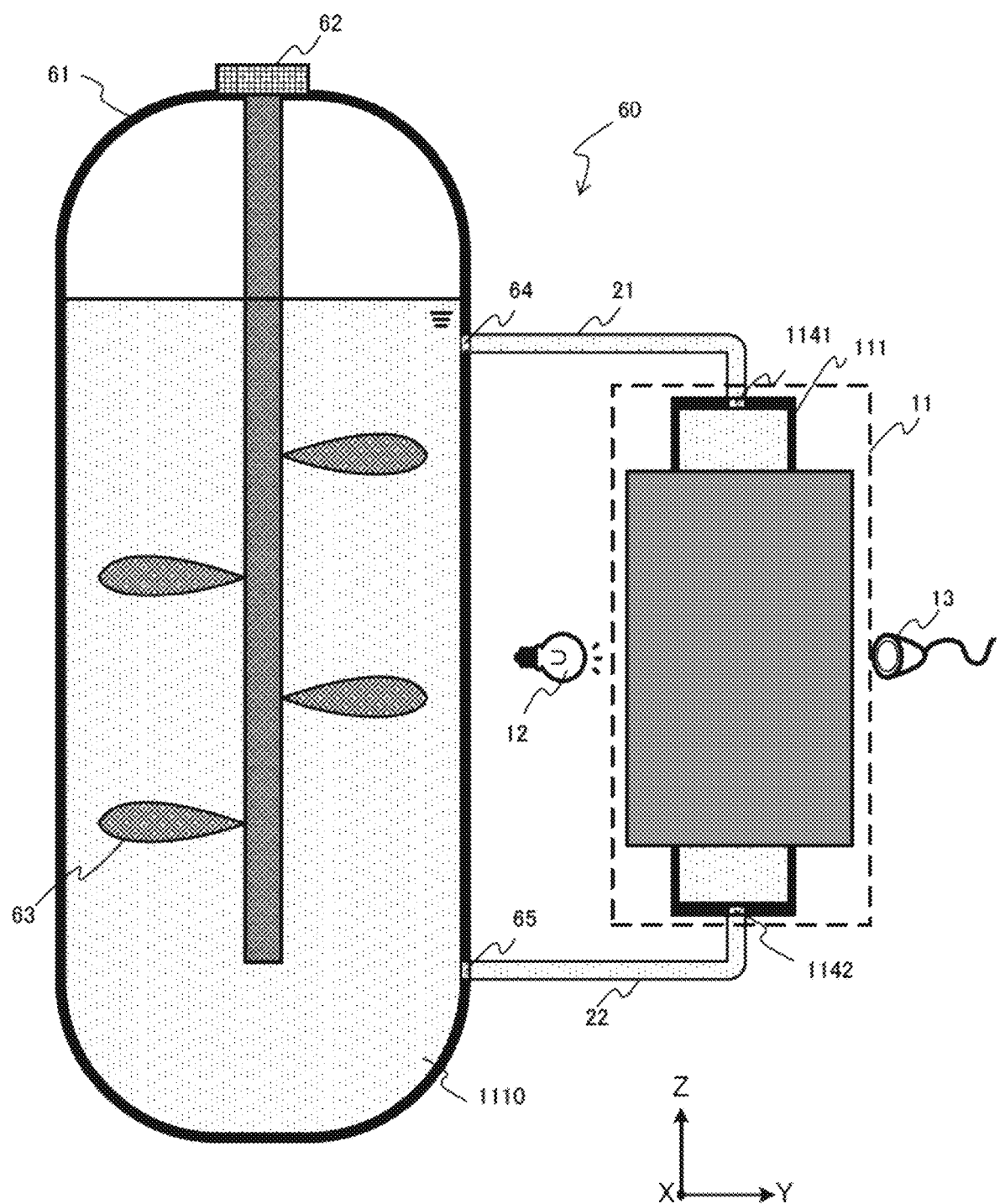
FIG. 13 is a view showing a first configuration example of the optical analysis system.

Next, FIG. 13 shows a first configuration example of an optical analysis system to which the optical analysis device 10 is applied.

The optical analysis system 60 includes the optical analysis device 10 and a stirring tank 61. In FIG. 13, among the configuration elements of the optical analysis device 10, only the analysis unit 11, the light source portion 12 and the light receiving portion 13 are illustrated, and the control unit 14 or the like are not illustrated.

The stirring tank 61 includes a motor 62 that rotates a rotating shaft and a plurality of stirring blades 63 provided around the rotating shaft. The stirring tank 61 is provided with an outflow port 64 connected to one end of the pipe 21 and an inflow port 65 connected to one end of the pipe 22.

The other end of the pipe 21 whose one end is connected to the outflow port 64, is connected to a supply port 1141 of the analysis cell 111. The other end of the pipe 22 is connected to a discharge port 1142 of the analysis cell 111.

Therefore, in the optical analysis system 60, it is possible to circulate the liquid sample 1110 by connecting the stirring tank 61 and the analysis cell 111 with pipes 21 and 22.

The optical analysis system 60 can be used for stirring a liquid sample or mixing other substances in the liquid sample, for example, in manufacturing processing of chemicals or the like.

<Second Configuration Example of Optical Analysis System to which Optical Analysis Device 10 is Applied>

Figure 14:
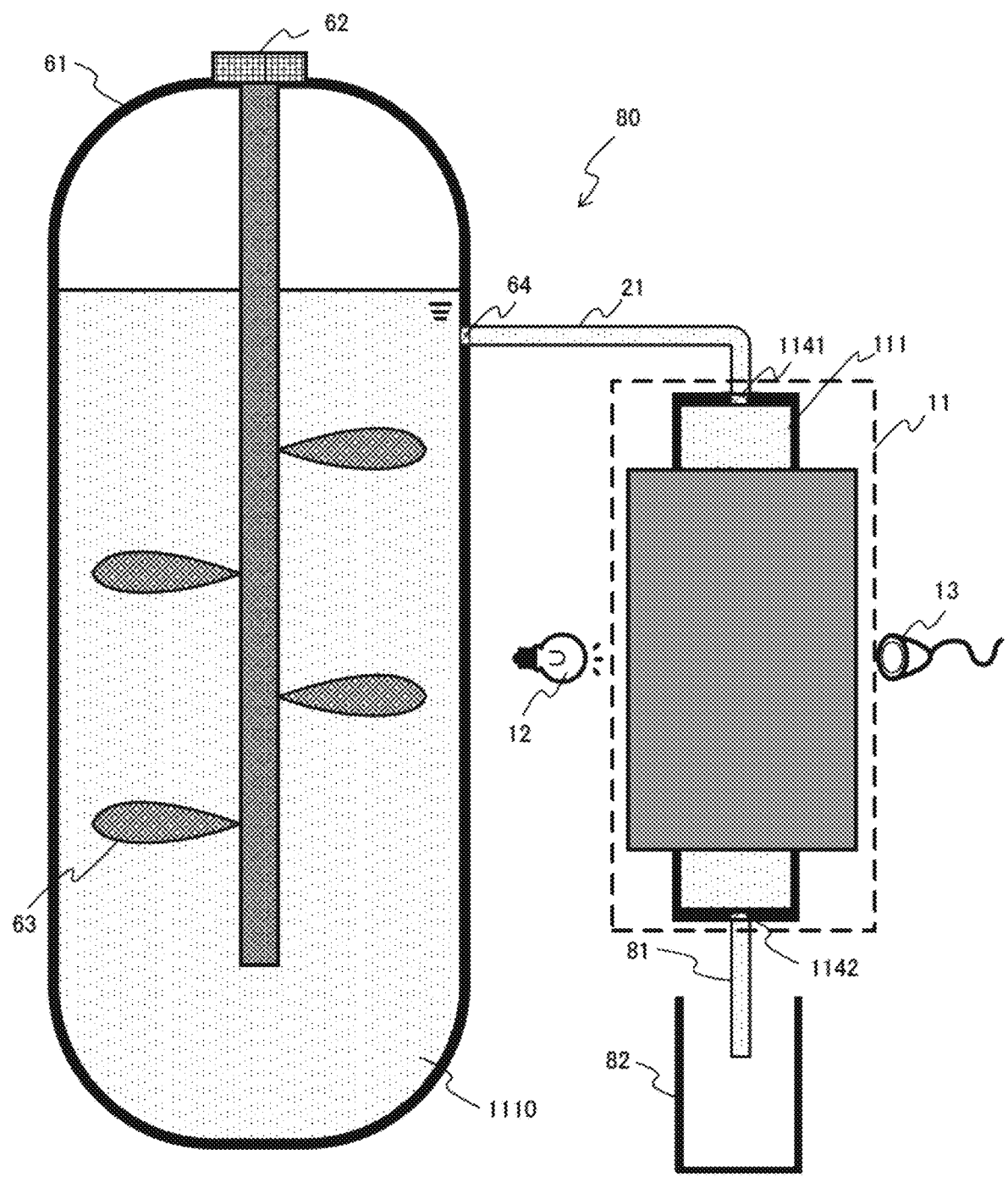
FIG. 14 is a view showing a second configuration example of the optical analysis system.

Next, FIG. 14 shows a second configuration example of the optical analysis system to which the optical analysis device 10 is applied.

The optical analysis system 80 includes the optical analysis device 10 and a stirring tank 61. In FIG. 14, among the configuration, elements of the optical, analysis device 10, only the analysis unit 11, the light source portion 12, the light receiving portion 13, and the pipes 21 and 22 are illustrated, and the other configuration elements (the control unit 14 or the like) are not illustrated.

Further, among the configuration elements of the optical analysis system 80, the same reference numerals are given to configuration elements common to the optical analysis system 60 shown in FIG. 13, and the description thereof will be appropriately omitted.

The stirring tank 61 includes a motor 62 that rotates a rotating shaft and a plurality of stirring blades 63 provided around the rotating shaft. The stirring tank 61 is provided with an outflow port 64 connected to one end of the pipe 21.

The other end of the pipe 21 whose one end is connected to the outflow port 64, is connected to a supply port 1141 of the analysis cell 111. A recovery system 82 is provided on the bottom part of the discharge port 1142 of the analysis cell 111 via a pipe 81.

Therefore, the spectroscopic analysis system 80 does not circulate the liquid sample 1110 to the stirring tank 61, and recovers the liquid sample 1110 after a spectroscopic analysis by the recovery system 82.

The optical analysis system 80, for example, can prevent the liquid sample 1110 in the stirring tank 61 from being denatured, when the liquid sample 1110 is denatured or when there is a concern that the liquid sample 1110 is denatured due to the ultrasonic wave or the light with which the liquid sample 1110 is irradiated in the analysis cell 111.

<Modification Example of Optical Analysis Device 10>

Figure 15:
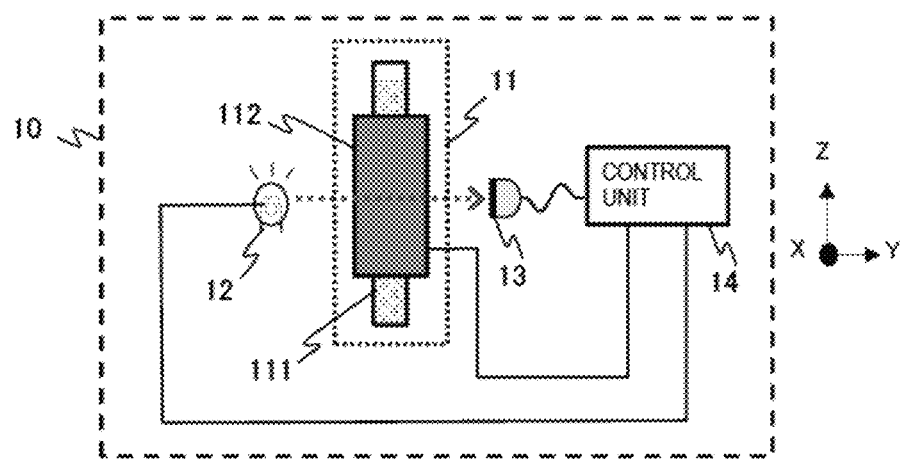
FIG. 15 is a view showing a modification example of the optical analysis device.
Figure 16:
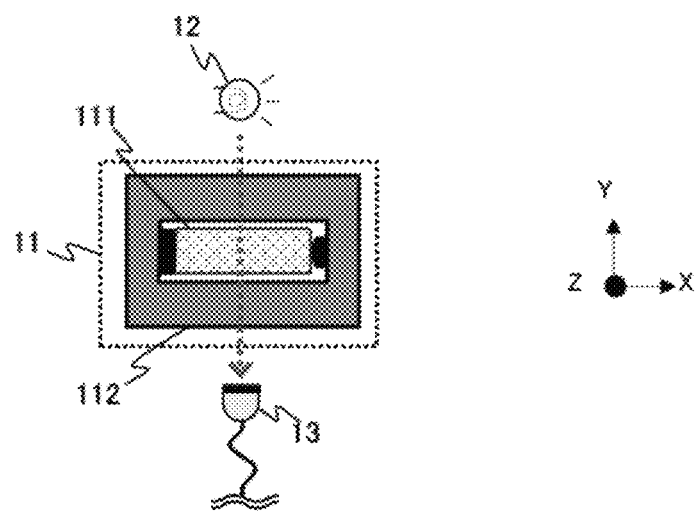
FIG. 16 is a top view showing a configuration example of an analysis unit in the modification example of the optical analysis device.
Figure 17:
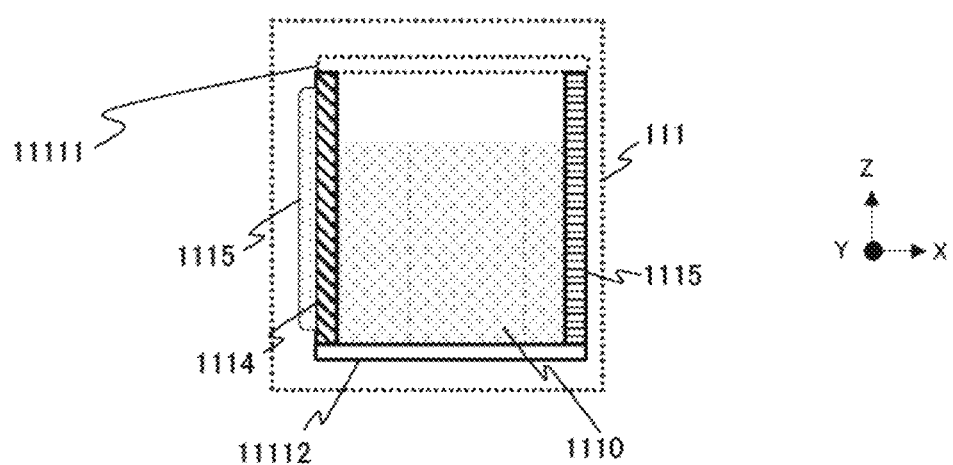
FIG. 17 is a cross-sectional view in the XZ plane showing a configuration example of an analysis cell in the modification example of the optical analysis device.

Next, a modified example of the above-described optical analysis device 10 will be described. FIG. 15 shows the modification example of the optical analysis device 10. FIG. 16 is a top view showing a configuration example of the analysis unit 11 in the modification example. FIG. 17 is a cross-sectional view in the XZ plane showing a configuration example of the analysis cell 111 in the modification example. In FIGS. 15 to 17, the same reference numerals are given to configuration elements common to the optical analysis device 10 shown in FIG. 1, and the description thereof will be omitted as appropriate.

As shown in FIGS. 15 and 16, the modified example has a configuration in which the pipes 21 and 22 are omitted from the optical analysis device 10 shown in FIG. 1.

In addition, regarding the analysis cell 111 in the modification example, as shown in FIG. 17, among the three sets of facing wall surface pairs forming a rectangular parallelepiped as the analysis cell 111, that is, the upper side wall surface 11111 forming the wall surface pair 1111 parallel to the XY plane, is opened so as to directly supply the liquid sample. Further, from the wall surface 11112 on the lower side of the wall surface pair 1111, the discharge port for discharging the liquid sample is omitted.

Therefore, in this modification example, it suffices to perform a sampling of the liquid sample by an amount necessary for analysis.

The effects described in this specification are merely examples, and are not intended to be limited, and other effects may be provided.

The present invention is not limited to the embodiments described above, and includes various modification examples. For example, the above-described embodiments are described in detail in order to explain the present invention in an easy-to-understand manner, and the present invention is not necessarily limited to those having all the configuration elements described. In addition, a part of the configuration of a certain embodiment can be replaced by the configuration of another embodiment, and the configuration of another embodiment can foe added to the configuration of the certain embodiment. Further, it is possible to add, delete, and replace other configurations with respect to a part, of the configuration of each embodiment.

The present invention can be provided not only in an analysis cell and an analysis unit, but also in various aspects such as an optical analysis device or an optical analysis system.

REFERENCE SIGNS LIST

10: optical analysis device
11: analysis unit
12: light source portion
13: light receiving portion
14: control unit
21: pipe
22: pipe
60: optical analysis system
61: stirring tank
62: motor
63: stirring blade
64: outflow port
65: inflow port
80: optical analysis system 81: pipe
82: recovery system
111: analysis cell
112: holder
141; drive-unit
201: node
202: anti-node
211: flocculation region
212: transparent region
1110: liquid sample
1111: wall surface pair
1112: wall surface pair
1113: wall surface pair
1115: gel-like substance
1121: housing
1122: ultrasonic oscillator
1123: contact terminal
1125: opening portion
1131: wall surface
1141: supply port
1142: discharge port
11111: wall surface
11112: wall surface
11131: wall surface
11132: wall surface
11221: vibration portion
11222: metal substrate

The invention claimed is:

1. An analysis cell that is detachable and replaceable with respect to an analysis unit and accommodates a liquid sample, the analysis cell comprising:
a first wall surface pair that is made of a material transmitting a light; and
a second wall surface pair for propagating an ultrasonic wave to the accommodated liquid sample,
wherein a first wall surface and a second wall surface forming the second wall surface pair and facing each other, are formed of materials having different acoustic impedances,
wherein a thickness of the first wall surface is an integral multiple of ½ of a wavelength of the ultrasonic wave.

2. The analysis cell according to claim 1,
wherein a gel-like substance is provided on an outside of the first wall surface, and the first wall surface has an acoustic impedance smaller than an acoustic impedance of the second wall surface.

3. The analysis cell according to claim 1,
wherein the first wall surface pair is made of a quartz glass or an acrylic as the material that transmits a light.

4. The analysis cell according to claim 1,
wherein the first wall surface with a smaller acoustic impedance forming the second wall surface pair is made of a quartz glass or an acrylic, and
wherein the second wall surface with a larger acoustic impedance forming the second wall surface pair is made of a metal.

5. The analysis cell according to claim 1, further comprising:
a third wall surface pair that is provided with a supply port for supplying the liquid sample to the analysis cell is provided on one wall surface and a discharge port for discharging the liquid sample from the analysis cell is provided on the other wall surface.

6. The analysis cell according to claim 5,
wherein the liquid sample discharged from the discharge port is circulated and supplied to the analysis cell from the supply port.

7. An analysis unit comprising:
an analysis cell for accommodating a liquid sample; and
a holder that holds the analysis cell in a detachable and replaceable manner,
wherein the analysis cell includes
a first wall surface pair that is made of a material transmitting a light, and
a second wall surface pair for propagating an ultrasonic wave to the accommodated liquid sample,
wherein a first wall surface and a second wall surface forming the second wall surface pair and facing each other, are formed of materials having different acoustic impedances, and
wherein the holder includes an ultrasonic oscillator that oscillates the ultrasonic wave to be propagated to the liquid sample,
wherein a thickness of the first wall surface is an integral multiple of ½ of a wavelength of the ultrasonic wave.

8. The analysis unit according to claim 7,
wherein a gel-like substance is provided on an outside of the first wall surface having an acoustic impedance smaller than an acoustic impedance of the second wall surface, and
wherein the ultrasonic oscillator is in close contact with the first wall surface through the gel-like substance, and propagates the ultrasonic wave to the liquid sample through the gel-like substance and the first wall surface.

9. The analysis unit according to claim 7,
wherein the holder includes a contact terminal that is in close contact with the second wall surface and holds the analysis cell.

10. The analysis unit according to claim 7,
wherein the holder holds the analysis cell with a gap between the holder and the first wall surface pair.

* * * * *